UNITED STATES PATENT OFFICE.

GEORGE E. SANDERS, OF ANNAPOLIS ROYAL, NOVA SCOTIA, CANADA, ASSIGNOR, BY MESNE ASSIGNMENTS, TO THE GOVERNMENT OF THE UNITED STATES AND THE PEOPLE OF THE UNITED STATES.

INSECTICIDE AND FUNGICIDE.

1,324,175.  Specification of Letters Patent.  Patented Dec. 9, 1919.

No Drawing.  Application filed April 23, 1919.  Serial No. 292,205.

(FILED UNDER THE ACT OF MARCH 3, 1883, 22 STAT. L., 625.)

*To all whom it may concern:*

Be it known that I, GEORGE ETHELBERT SANDERS, a subject of Great Britain, residing in the town of Annapolis Royal, Nova Scotia, Canada, (whose post-office address is Dominion Entomological Laboratory, Annapolis Royal, N. S.,) have invented a new Insecticide and Fungicide.

This application is made under the act of March 3, 1883, chapter 143 (22 Stat. 625), and the invention herein described, and claimed, may be used by the Government of the United States or any of its officers or employees in the prosecution of work for the Government, and by any person in the United States without payment to me of any royalty thereon.

My invention relates to a new insecticide and fungicide produced in the following manner: I mix dehydrated copper sulfate, commercial arsenate of lime, and commercial hydrated lime in proportions, varying from five to twenty-five per cent. of dehydrated copper sulfate and from three to twelve per cent. of arsenate of lime, the remainder being made up of hydrated lime. The dehydrated copper sulfate ($CuSO_4$) may contain up to one molecule of water crystallization, and is powdered to a sufficient degree to pass a screen of two hundred meshes to one inch. The arsenate of lime used in my process may be any commercial brand of calcium arsenate containing from thirty-five to fifty per cent. of arsenate oxid ($As_2O_5$) and powdered so that one pound thereof shall occupy not less than eighty cubic inches of space. The hydrated lime used in the process may be any of the commercial brands now on the market.

The three ingredients used in making my insecticide and fungicide are mixed together by any suitable mechanical means.

Having described my invention, I claim:

A composition of matter comprising dehydrated copper sulfate, a smaller proportion of arsenate of lime, and a substantially larger proportion of hydrated lime.

In testimony whereof, I affix my signature in the presence of two subscribing witnesses.

GEORGE E. SANDERS.

Witnesses:
 L. M. HOW,
 A. KELSALL.